(12) United States Patent
Smits et al.

(10) Patent No.: US 8,250,006 B2
(45) Date of Patent: Aug. 21, 2012

(54) INFERENTIAL SENSORS DEVELOPED USING THREE-DIMENSIONAL PARETO-FRONT GENETIC PROGRAMMING

(75) Inventors: Guido Freddy Smits, Wijnegem (BE); Arthur Karl Kordon, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 558 days.

(21) Appl. No.: 12/531,946

(22) PCT Filed: Feb. 21, 2008

(86) PCT No.: PCT/US2008/054599
§ 371 (c)(1),
(2), (4) Date: Sep. 18, 2009

(87) PCT Pub. No.: WO2008/115655
PCT Pub. Date: Sep. 25, 2008

(65) Prior Publication Data
US 2010/0049340 A1 Feb. 25, 2010

Related U.S. Application Data

(60) Provisional application No. 60/895,637, filed on Mar. 19, 2007.

(51) Int. Cl.
*G06F 15/18* (2006.01)
*G06N 3/00* (2006.01)
*G06N 3/12* (2006.01)
*G06N 5/04* (2006.01)
*G05B 13/04* (2006.01)

(52) U.S. Cl. ............................... 706/13; 700/31

(58) Field of Classification Search .................. 706/13
See application file for complete search history.

(56) References Cited

U.S. PATENT DOCUMENTS
4,935,877 A   6/1990   Koza
(Continued)

FOREIGN PATENT DOCUMENTS
EP   1367248 A1   12/2003
(Continued)

OTHER PUBLICATIONS

Stefan Bleuler et al., "Multiobjective Genetic Programming: Reducing Bloat Using SPEA2," Proceedings of CEC-2001, pp. 536-543, 2001.
(Continued)

*Primary Examiner* — Michael B Holmes
(74) *Attorney, Agent, or Firm* — McDonnell Boehnen Hulbert & Berghoff LLP

(57) ABSTRACT

A predictive algorithm for predictive at least one output variable based on a plurality of input variables is developed using a genetic programming technique that evolves a population of candidate algorithms through multiple generations. Within each generation, the candidate algorithms are evaluated based on three fitness criteria: (i) an accuracy criterion that evaluates each candidate algorithm's ability to predict historical measurements of the at least one output variable based on corresponding historical measurements of the input variables; (ii) a complexity criterion that evaluates each candidate algorithm's complexity; and (iii) a smoothness criterion that evaluates each candidate algorithm's nonlinearity. The predictive algorithm may be implemented in an inferential sensor that is used to monitor a physical, chemical, or biological process, such as an industrial process in an industrial plant.

20 Claims, 7 Drawing Sheets

U.S. PATENT DOCUMENTS

| | | | |
|---|---|---|---|
| 5,282,261 | A | 1/1994 | Skeirik |
| 5,386,373 | A | 1/1995 | Keeler et al. |
| 6,144,952 | A | 11/2000 | Keeler et al. |
| 6,278,962 | B1 | 8/2001 | Klimasauskas et al. |
| 6,453,265 | B1 * | 9/2002 | Dekhil et al. ............ 702/181 |
| 2003/0100632 | A1 | 5/2003 | Taylor et al. |

FOREIGN PATENT DOCUMENTS

WO    2006/100646 A2    9/2006

OTHER PUBLICATIONS

Edwin D. de Jong et al., "Multi-Objective Methods for Tree Size Control," Genetic Programming and Evolvable Machines, vol. 4, No. 3, pp. 211-233, 2003.

Arthur K. Kordon et al., "Robust Soft Sensor Development Using Genetic Programming," Chapter 3 of Nature-Inspired Methods in Chemometrics: Genetic Algorithms and Artificial Neural Networks, Ricardo Leardi, ed., vol. 23 of Data Handling in Science and Technology, Elsevier, 2004.

Arthur Kordon et al., "Biomass Inferential Sensor Based on Ensemble of Models Generated by Genetic Programming," Proceedings of GECCO-2004, pp. 1078-1089, 2004.

Pavilion Technologies, Inc., "Software CEM™," product description, 2003.

Aspen Technology, Inc., "Aspen IQ™," product description, 2003.

Gensym Corp., "G2 NeurOn-Line," product description, 2006.

* cited by examiner

| GENPRO+ Settings | Ref. Set | Test Set |
|---|---|---|
| Calculate fitness | Yes | No |
| Starting pattern nr | 1 | 1 |
| Ending pattern nr | 251 | 251 |
| Random subset selection [%] | 100 | |
| Report tag - will be part of report filename | VOC | |
| Number of independent runs | 5 | |
| Number of cascades | 36 | |
| Number of generations | 25 | |
| Population size | 100 | |
| Prob. for function selection | 0.85 | |
| Fitness function | Corr.C | |
| Insensitive zone [0:1] | 0 | |
| Expression complexity limit | 400 | |
| Complexity function | Equation | |
| Range of number of layers in paretofront | 6 | 2 |
| Reproductions/generation | 0 | |
| Fraction of models generated by crossover [0:1] | 0.95 | |
| Probability for mutation of terminals [0:1] | 0.3 | |
| Population tournament selection | 5 | 1 |
| Archive tournament selection | 3 | 1 |

FIG. 4

INFERENTIAL SENSORS DEVELOPED USING THREE-DIMENSIONAL PARETO-FRONT GENETIC PROGRAMMING

BACKGROUND

1. Field of the Invention

The present invention relates to soft or inferential sensors and, more particularly, to inferential sensors that are developed using a three-dimensional Pareto-front genetic programming technique.

2. Description of Related Art

Industrial processes are often monitored and controlled by measuring various process parameters. Such process parameters may include, for example, temperature, pressure, flow rates, etc., depending on the industrial process. Some of the relevant process parameters may be relatively easy to measure, e.g., using hardware sensors, while the process is on-line. Other process parameters, however, may be difficult to measure under normal operating conditions. Inferential sensors or soft sensors have been used to infer such difficult-to-measure process parameters (output variables) based on easily-measured process parameters (input variables).

In a typical approach for developing an inferential sensor for a given process, historical data is collected for a broad range of process conditions. Using this historical data, various techniques may then be used to develop an empirical model that can predict the desired output variable based on the available input variables. Linear regression is one technique that could potentially be used. In practice, however, linear regression has only limited applicability because the majority of industrial processes are nonlinear, especially in the chemical industry.

Neural network models have been used to model nonlinear industrial processes. However, neural network models are often associated with a number of different problems. First, neural network models can experience high sensitivity toward process changes. This, in turn, may create a need for frequent model re-development and re-adjustment.

Second, neural network models often exhibit poor performance outside of the range used for model development. In other words, once a neural network model has been trained with a given range of values, the neural network model may be unable to extrapolate well outside of that range. The inability to extrapolate could have disastrous consequences for certain industrial processes, especially in the chemical industry.

Third, a neural network model may be viewed as a "black box," in that the neural network may make predictions without making clear the mechanism for prediction. Thus, neural network models can be difficult to interpret.

Fourth, neural network models can be difficult to implement and support. They may require specialized software and specialized training.

Accordingly, there is a need for other ways of developing inferential sensors that can infer difficult-to-measure process parameters based on easily-measured process parameters.

SUMMARY

In a first principal aspect, an exemplary embodiment provides a method of developing a predictive algorithm for predicting at least one output variable based on a plurality of input variables. In accordance with the method, a first set of data representative of a physical, chemical, or biological process is obtained. The first set of data includes first-set measurements of the at least one output variable and corresponding first-set measurements of the input variables. A plurality of candidate algorithms is evolved using a genetic programming technique that applies at least three fitness criteria. The at least three fitness criteria include: (i) an accuracy criterion that evaluates each candidate algorithm's ability to predict the first-set measurements of the at least one output variable based on the corresponding first-set measurements of the input variables; (ii) a complexity criterion that evaluates each candidate algorithm's complexity; and (iii) a smoothness criterion that evaluates each candidate algorithm's nonlinearity. One of the candidate algorithms is selected as the predictive algorithm.

In a second principal aspect, an exemplary embodiment provides a method of monitoring a physical, chemical, or biological process. In accordance with the method, current values of a plurality of measurable parameters of the physical, chemical, or biological process are determined. The current values are provided to an inferential sensor. The inferential sensor is configured to use at least one predictive algorithm that predicts an additional parameter of the physical, chemical, or biological process based on the measurable parameters, the at least one predictive algorithm having been optimized with respect to accuracy, complexity, and smoothness. The inferential sensor uses the at least one predictive algorithm to determine an inferred value of the additional parameter based on the current valued of the measurable parameters.

In a third principal aspect, an exemplary embodiment provides a system for monitoring a physical, chemical, or biological process. The system comprises: (i) at least one hardware sensor for obtaining measured values of a plurality of parameters of the physical, chemical, or biological process; and (ii) an inferential sensor for determining an inferred value of an additional parameter of the physical, chemical, or biological process based on the measured values, the inferential sensor being configured to determine the inferred value using at least one predictive algorithm that has been optimized with respect to accuracy, complexity, and smoothness using a genetic programming technique.

BRIEF DESCRIPTION OF THE DRAWINGS

FIG. 4 is a screen shot of set-up parameters used for developing an algorithm for predicting VOC emissions using genetic programming, in accordance with an exemplary embodiment.

DETAILED DESCRIPTION OF EXEMPLARY EMBODIMENTS

1. Overview

Figure 1:
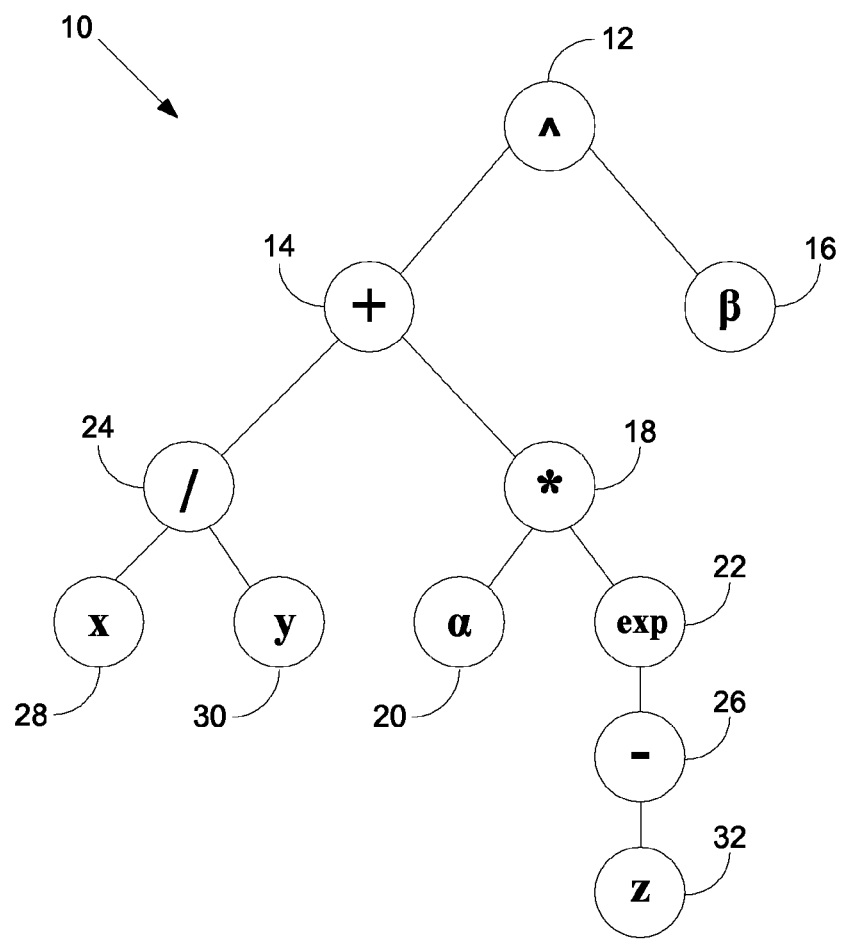
FIG. 1 is a node representation of a predictive algorithm, in accordance with an exemplary embodiment.

A predictive algorithm for predicting at least one output variable based on a plurality of input variables may be developed using a genetic programming technique that applies at least three fitness criteria. The input variables and the at least one output variable could, for example, correspond to various process parameters of an industrial process or any physical, chemical, or biological process. In one advantageous approach, the input variables may correspond to parameters that can be readily measured while the process is on-line, e.g., using hardware sensors, whereas the at least one output variable may correspond to one or more parameters that are more difficult to measure. In this way, the predictive algorithm may be used in an inferential sensor to infer the values of one or more difficult-to-measure process parameters (the output variables) based on the values of easily-measured process parameters (the input variables). The output of the inferential sensor may then be used by systems that monitor and/or control the process.

A genetic programming technique may be used to develop a predictive algorithm that can accurately reproduce historical data representative of the physical, chemical, or biological process. The historical data may include a number of measurements of the at least one output variable (e.g., taken at various times and/or under various operating conditions) and corresponding measurements of the input variables.

To find a predictive algorithm with the desired accuracy, the genetic programming technique may evolve a population of candidate algorithms through multiple generations. Within each generation, the candidate algorithms may be evaluated based on various fitness criteria. In an exemplary embodiment, three fitness criteria are applied: (i) an accuracy criterion that evaluates each candidate algorithm's ability to predict the measurements of the at least one output variable based on the corresponding measurements of the input variables; (ii) a complexity criterion that evaluates each candidate algorithm's complexity; and (iii) a smoothness criterion that evaluates each candidate algorithm's nonlinearity. It is to be understood that these fitness criteria are exemplary only, as additional and/or alternative fitness criteria could be applied.

The candidate algorithms that are the most fit based on the applied fitness criteria are allowed to propagate into the next generation through the use of genetic operations such as copying, crossover, and mutation. In this way, the genetic programming technique evolves candidate algorithms that, on average, become progressively more fit (as judged by the applied fitness criteria) from one generation to the next.

Eventually, the evolutionary process terminates, e.g., based on the number of generations or because of the fulfillment of some other termination criterion. The population at that stage may then be examined to determine which of the candidate algorithms lie on a three-dimensional Pareto-front with respect to the three applied fitness criteria. The Pareto-front algorithms are those algorithms within the population for which no improved fitness with respect to one fitness criterion can be obtained in another algorithm in the population without reducing fitness with respect to another fitness criterion. In this way, the Pareto-front algorithms may be considered to be "optimal" with respect to the three fitness criteria. Then, based on other selection criteria, one particular algorithm may be selected from among the Pareto-front algorithms to be used as the predictive algorithm.

The predictive algorithm that is selected may be subjected to further testing, for example, using additional historical data. If the predictive algorithm is found to be acceptable, then it may be used on-line, e.g., as part of an inferential sensor that infers one or more parameters of the physical, chemical, or biological process. By developing the predictive algorithm in this way, the predictive algorithm may be optimized with respect to accuracy, complexity, and smoothness.

Optimization with respect to these three fitness criteria may provide a number of advantages. In particular, the accuracy criterion advantageously favors the development of algorithms that are accurate. However, it is to be understood that different applications may require different levels of accuracy. Thus, once the desired level of accuracy is obtained, other criteria may become important. In this regard, the complexity criterion favors the development of parsimonious algorithms, which may be more computationally efficient and also more robust toward process changes. The smoothness criterion favors the development of more linear algorithms, which are more likely to extrapolate well. This last point may be particularly important given the variability of process parameters. Even though a predictive algorithm may have been developed using historical data with values for the input variables that fall within a certain developmental range, it may be desirable for the predictive algorithm to remain accurate when the values of the input variables fall outside of the developmental range.

Thus, by applying fitness criteria of complexity and smoothness, as well as accuracy, genetic programming techniques may develop predictive algorithms that satisfy objectives in addition to accuracy. For example, the techniques may result in predictive algorithms with improved robustness toward process changes and improved ability to extrapolate beyond developmental ranges.

2. Exemplary Node Representation of Predictive Algorithms

In an exemplary embodiment, a genetic programming technique is used to develop the predictive algorithm in the form of a mathematical expression. The mathematical expression may then be used to calculate the value of the output variable based on the values of the input variables. An example of such a mathematical expression is the following:

$$V = [x/y + \alpha \exp(-z)]^\beta \quad (1)$$

where V is the output variable, x, y, and z are the input variables, and $\alpha$ and $\beta$ are constants.

For purposes of illustrating genetic programming techniques, the mathematical expressions may be represented by tree structures in accordance with how the expressions would be parsed. Thus, mathematical expression (1) set forth above may be represented by a tree structure 10 as illustrated in FIG. 1. In tree structure 10, the functions, input variables, and constants are represented by nodes 12-32. In particular, nodes 28, 30, and 32 represent input variables x, y, and z, respectively. Nodes 20 and 16 represent constants $\alpha$ and $\beta$, respectively. Node 24 represents a division function, as indicated by the "/" symbol. Node 26 represents a sign change function, as indicated by the "−" symbol. Node 22 represents an exponential function, as indicated by the "exp" symbol. Node 18 represents a multiplication function, as indicated by the "*" symbol. Node 14 represents an addition function, as indicated by the "+" symbol. Node 12 represents a power function, as indicated by the "^" symbol.

It is to be understood that expression (1) and the corresponding tree structure 10 are exemplary only. In general, the expressions developed by genetic programming may include any number of nodes, and the nodes may include any number of functions, input variables, and constants. The functions may include algebraic functions (e.g., addition, subtraction, multiplication, division, sign change, square root, power, etc.), transcendental functions (e.g., exponentials, logarithms, sine, cosine, etc.), conditional functions (e.g., functions that take on different values depending on whether the arguments satisfy certain conditions, such as whether or not the argument is greater than zero), or other types of functions. However, the functions need not be mathematical functions. For example, if the input variable represent logical states, then the functions may include logical functions such as AND, OR, XOR, and NOT. As another example, the input variables may include textual information, in which case the functions may include string functions. Still other types of functions could also be used.

The basic idea of genetic programming techniques is to evolve a population of expressions, which may be conceptualized as tree structures as in FIG. 1, by applying genetic operations that manipulate the nodes. The manipulation of the nodes may involve "mutations" that change one or more nodes. For example, a mutation could change one function into another function. Thus, tree structure 10 might be mutated by changing node 18 from a multiplication function to an addition function. Alternatively, a mutation may affect one or more of the terminal nodes, i.e., the nodes representing the input variables and constants. Thus, tree structure 10 might be mutated by changing node 20 from the constant, $\alpha$, to an input variable, such as x.

The manipulation of the nodes may also involve "crossover" operations, in which two expressions swap one or more nodes. For example, in tree structure 10, nodes 22, 26, 32 might be replaced with one or more nodes donated from another expression. The donated nodes may include different functions, different input variables, and/or different constants. In addition, the number of nodes in an expression could increase or decrease as a result of a crossover operation. For example, nodes 22, 26, 32, representing exp(−z) in tree structure 10, might be replaced by a single node, such as the input variable z. Alternative, nodes 22, 26, and 32 might be replaced by a more complicated expression, such as log(x+ yz), representing a greater number of nodes.

Although mutation and crossover are typical genetic operations, it is to be understood that nodes could be manipulated in other ways. As one example, editing operations may be applied. Such editing operations may remove existing nodes and/or insert new nodes into an expression while making sure that the overall expression remains valid. As another example, simplification operations may be applied. Such simplification operations may try to simplify expressions, for example, by replacing sub-trees with simpler, equivalent expressions. Thus, a sub-tree that includes functions and constants but no variables might be replaced by a new constant.

The node representation of expressions can also be useful for other purposes. For example, the number of nodes of in an expression may be used as a measure of the complexity of the expression. For example, the expression represented by tree structure 10 in FIG. 1, with eleven nodes, may be considered to be more complex than an expression with a fewer number of nodes but less complex than an expression than a greater number of nodes. Thus, this approach considers each node as contributing to the complexity of the expression by the same amount. Alternatively, different nodes may be given different weights for purposes of determining complexity. As one example, a node representing a transcendental function might be considered to be more complex than a node representing an addition function and, therefore, might be given more weight when determining complexity. As another example, a complexity weighting of a node may be calculated as the number of nodes in all of the sub-trees depending from the node. Thus, node 22 in FIG. 1 would have a complexity weighting of 6, based on three nodes in the "exp(−z)" sub-tree, two nodes in the "−z" sub-tree, and one node in the "z" sub-tree. The complexity of tree structure 10 may then be taken as the sum of the complexity weightings of each its nodes, i.e., nodes 12-32.

3. Exemplary Method of Developing a Predictive Algorithm

Figure 2:
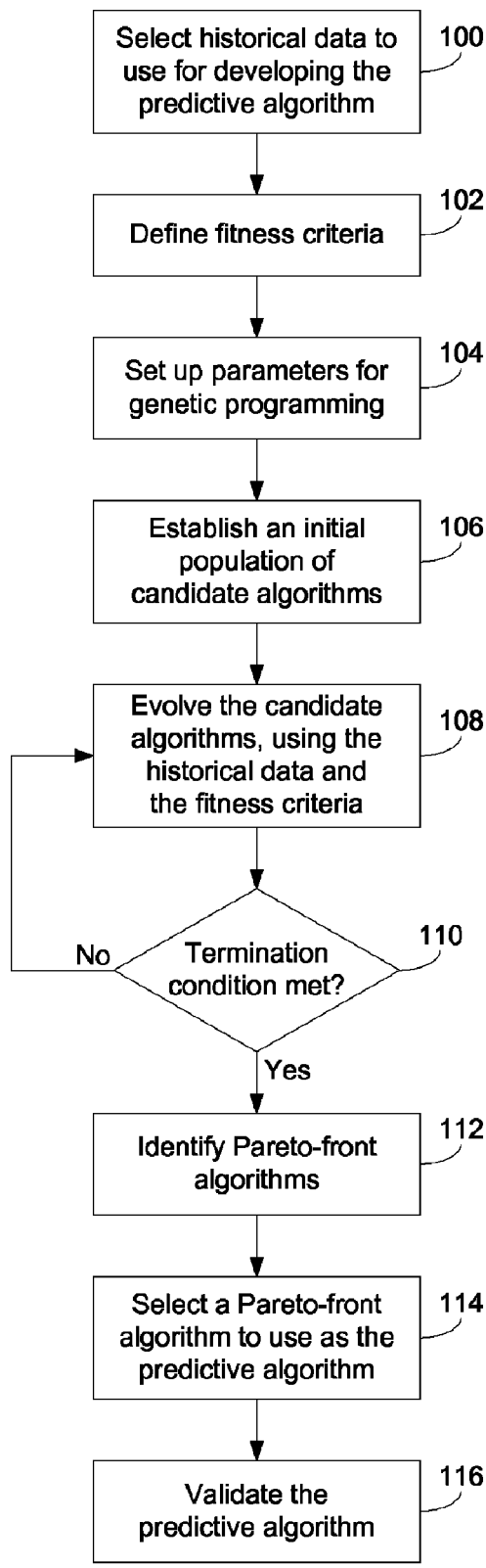
FIG. 2 is a flow chart for developing a predictive algorithm, in accordance with an exemplary embodiment.

FIG. 2 is a flowchart illustrating an exemplary method for developing a predictive algorithm using genetic programming. In this example, the predictive algorithm is being developed to predict a particular output variable, based on various input variables, for a physical, chemical, or biological process.

The method might begin by selecting historical data to use for developing the predictive algorithm, as indicated by block 100. The historical data may be representative of the same process or a similar process for which the predictive algorithm is intended. The historical data may include a number of data points, with each data point including a measurement of the output variable and corresponding measurements of the input variables. Some or all of the data may have been collected as part of the normal operation of the process. Alternatively, the data may have been collected specifically for the purpose of model development, for example, by taking the process off-line and/or by systematically adjusting the input parameters. In addition, the measurements could be obtained in various ways. For example, hardware sensors might be used to obtain direct measurements of one or more of the process variables. Alternatively, some or all of the measurements might be obtained indirectly, e.g., inferred from inferential sensors or calculated based on other considerations.

The historical data may also go through one or more pre-processing steps before the data is used to develop the predictive algorithm. Such pre-processing may be used to identify and remove outliers. Pre-processing steps may also be used to determine which input variables are relevant to the output variable that is to be predicted, for example, by sensitivity studies. Thus, the historical data may be culled to focus on the measurements that represent the most reliable data that is most likely to be relevant to the output variable of interest.

This pre-processed historical data may be further divided into a first set that is to be used as "training data" for developing the predictive algorithm and a second set that is to be used for testing the predictive algorithm that is developed. The two sets may define different ranges of input and/or output variables. By using different ranges, the second set of data may be used to test the predictive algorithm's ability to extrapolate outside of the range used to develop it.

Another important step in the development method is the definition of fitness criteria, as indicated by block 102. The fitness criteria will be used to evaluate the fitness of the candidate algorithms evolved through genetic programming. In an exemplary embodiment, three fitness criteria are used: (i) an accuracy criterion that evaluates each candidate algorithm's ability to predict the measurements of the at least one output variable based on the corresponding measurements of the input variables in the historical data; (ii) a complexity criterion that evaluates each candidate algorithm's complexity; and (iii) a smoothness criterion that evaluates each candidate algorithm's nonlinearity.

The accuracy criterion may apply any statistical measurement of the goodness of fit between the candidate algorithms and the historical data. Examples of such statistical measures include correlation coefficients and $R^2$ values. The more accurate a candidate algorithm is based on the statistical measurement, the more fit the candidate algorithm is considered to be.

The complexity criterion may apply a complexity measurement to each of the candidate algorithms. The complexity of a candidate algorithm could be measured by counting the number of nodes or levels in a tree-structure representation of the candidate algorithm. Alternatively, each node may be given a complexity weighting that contributes to the complexity of the overall expression. As described above, the complexity weighting of a node may be calculated as the number of nodes in each of the sub-trees depending from the node. The more complex a candidate algorithm is based on the complexity measurement, the less fit the candidate algorithm is considered to be.

The smoothness criterion may apply a nonlinearity measurement to each of the candidate algorithms. The more nonlinear a candidate algorithm is based on the nonlinearity measurement, the less fit the candidate algorithm is considered to be.

Nonlinearity could be measured in various ways. In one approach, a candidate algorithm could be sampled by applying a range of values for the input variables in the interval defined by the training data and calculating the corresponding values of the output variable. The amount of nonlinearlity of the candidate algorithm may then be quantified as the amount of variation in the sampled values of the output variable. In another approach, local derivatives may be taken of the candidate algorithm at various sampling points. The amount of nonlinearlity of the candidate algorithm may then be quantified as the amount of variation in the sampled derivatives.

In yet another approach, the nonlinearity of a candidate algorithm may be calculated on a node-by-node basis, in which the nonlinearity of each function node in the expression is determined and the nonlinearity of the overall expression is given as the sum of the nonlinearities of the nodes. The nonlinearity of a node may be determined in various ways, such as by the sampling techniques described above or by polynomial fitting. In the latter approach, the degree of nonlinearity of a node may be taken as the polynomial degree that is needed in order to fit the node function with a polynomial in the interval of the training data to within a prescribed tolerance.

In an exemplary embodiment, these three fitness criteria are applied independently. For example, the candidate algorithms in each generation may be evaluated with respect to each of these three fitness criteria, and the candidate algorithms that lie on the Pareto-front may be judged the fittest. Alternatively, these three fitness criteria may be weighted together to specify an overall fitness criteria. In that case, the candidate algorithms that have the highest overall fitness may be judged the fittest. These three fitness criteria could also be applied in other ways.

In addition to defining the fitness criteria, other parameters may need to be set up for a genetic programming operation, as indicated by block 104. One consideration may be the set of functions to be used for the genetic programming. Simple algebraic functions, such as addition, subtraction, multiplication, and division, are typically included. However, other types of functions, such as conditional functions and/or transcendental functions, may also be selected depending on the needs of the problem. For example, when data has a periodicity to it, sine and cosine functions may be selected. On the other hand, certain functions might be avoided, for example, because of their nonlinearity or because of their computational inefficiency.

Various other parameters may be used to set up the initial population of candidate algorithms. For example, when the initial population is generated randomly, the probability for selecting a function as a node may be specified. Higher function-selection probabilities will tend to result in more complex expressions. The size of the initial population of the candidate algorithms may also be specified. The size of the population may remain constant throughout the genetic programming operation. Alternatively, the population may be allowed to increase or decrease within preset limits. Typical settings for the population size are values between 100 to 1000. Typical settings for the other parameters are shown in FIG. 4.

Other parameters may be used to define the evolution process used in the genetic programming. For example, where crossover operations are used, a selectable parameter may be used to determine what fraction of the "offspring" are generated by crossover. Another selectable parameter may be used to determine the probabilities of random and guided crossover. Where mutation operations are used, selectable parameters may be used to determine the probability of a candidate algorithm experiencing a mutation and to determine the probability of mutating a function or a terminal node when a mutation does occur. A typical value for the probability of mutating a terminal node is 0.3.

One or more termination conditions may also be defined for a genetic programming operation. In one approach, the genetic programming operation may be set up to run for a fixed number of generations. In typical examples, the fixed number of generations could range from a few hundred to a thousand generations. However, other conditions for terminating the genetic programming operation could be specified.

It is to be understood that these set up parameters are exemplary only. Other selectable parameters may be used to define the genetic programming operation. Further, the values to use for the various selectable parameters may chosen in various ways, e.g., arbitrarily, based on "rules of thumb," based on trial-and-error, or based on other considerations such as a statistical design of experiments.

Once the genetic programming operation has been set up, an initial population of candidate algorithms may be established, as indicated by block 106. In some cases, the initial candidate algorithms may be generated randomly. For example, a function may be randomly selected for the top-level node. The dependent node or nodes may then be randomly selected (e.g., applying a preset probability for selecting a function or a terminal node) until a complete tree structure is created.

Alternatively, some or all of the initial candidate algorithms may be selected based on other considerations. For example, earlier studies (either empirical or theoretical) may have resulted in the development of one or more algorithms that may seem promising. These potentially-promising algorithms may then be included in the initial population.

The candidate algorithms are then evolved, using the historical data selected in block 100 and the fitness criteria defined in block 102, as indicated by block 108. In an exemplary evolutionary approach, the most fit candidate algorithms in the population are selected to generate "offspring" algorithms that are then used to replace the least fit candidate algorithms in the population.

For example, in an exemplary implementation, the current generation is taken as an "archive" of algorithms from which "parents" are chosen by a tournament process. In the tournament approach, a predetermined number (e.g., 3 to 5) of potential "parent" algorithms are randomly chosen from the archives A tournament process is then used to determine the "winners," i.e., which of the potential "parent" algorithms will be allowed to generate offspring. In an exemplary tournament process, the "winners" might be the two potential "parent" algorithms that have the highest accuracy. These two winners may then be allowed to generate offspring by crossover operations. It is to be understood that this tournament process is exemplary only, as other approaches may be used to determine which candidate algorithms generate offspring.

An offspring algorithm may be generated by a crossover operation that joins a sub-tree of one parent algorithm with the sub-tree of another parent algorithm. Thus, two parent algorithms may swap sub-trees to generate two different offspring algorithms. The sub-trees that are used for crossover may be selected randomly.

The offspring algorithms may then be subject to mutations, based on preselected mutation probabilities. In one approach, a mutation may be used to change one node (either a function or a terminal node, depending on how the genetic programming is set up) in a candidate algorithm. Alternatively, a mutation may be able to change multiple nodes (e.g., a sub-tree) in a candidate algorithm. In addition, some mutations might increase or decrease the number of nodes in a candidate algorithm. For example, if a function with only one dependent node is changed to a function that has two dependent nodes, then an additional terminal node may be randomly generated.

It is to be understood that the foregoing discussion of crossover and mutation operations is illustrative only. Crossover and mutation operations could be applied in different ways. In addition, other genetic operations may be used to evolve the candidate algorithms.

Offspring may continue to be generated in this way (e.g., using the tournament approach to select "parents") until the number of offspring specified by the population parameter is reached. Then, all of the candidate algorithms, including the "archive" algorithms and the "offspring" algorithms, may be evaluated with respect to the accuracy, complexity, and smoothness criteria. The candidate algorithms in the merged set of "archive" and "offspring" algorithms that are found to lie on or nearest to the Pareto-front may then be used to populate a new archive.

The size of the new archive may be specified as a percentage of the size of the "offspring" population, e.g., 75% to 100%. Thus, using the 100% example, an archive of 100 algorithms may be used to generate 100 offspring. Then, the 100 fittest algorithms from among the 200 algorithms in the merged set of archive and offspring algorithms are used to populate a new archive of 100 algorithms. In this way, the candidate algorithms that are the fittest with respect to accuracy, complexity, and smoothness continue on to the next generation, and the candidate algorithms, on average, become progressively more fit with each successive generation.

The candidate algorithms may continue to be evolved in this way until a termination condition is met, as indicated by block 110. When the termination condition is met, the population of candidate algorithms may be examined to determine which of the candidate algorithms lie on the Pareto-front with respect to the three fitness criteria, as indicated by block 112. Though the Pareto-front algorithms are typically only a small subset of the population, there may still be more than one. To select one of the Pareto-front algorithms as the predictive algorithm, additional selection criteria may be applied, as indicated by block 114.

The additional selection criteria may, for example, determine which of the Pareto-front algorithms has the most desirable balance of accuracy, complexity, and smoothness. The additional selection criteria may also evaluate the Pareto-front algorithms based on the content of their expressions. For example, expressions that have a meaningful physical interpretation and/or include certain types of functions may be preferred. In some cases, the predictive algorithm may be selected from among the Pareto-front algorithms based on additional testing, for example, using additional data as described below for the validation process. Thus, a predictive algorithm may be selected based on its ability to accurately extrapolate outside of the range used for the training data.

The predictive algorithm that is selected may then be validated, as indicated by block 116. Alternatively, the validation process may be used to select which Pareto-algorithm will be used as the predictive algorithm. The validation process may involve testing the predictive algorithm with additional data. The additional data could be, for example, a second set of data that was reserved from the historical data selected in block 100. If the predictive algorithm is able to reproduce the second set of historical data with a desired level of accuracy, then the predictive algorithm may be considered to be valid. As noted above, a second set of data for testing with values outside of the range of values included in the first set of data used for development may be used to test the predictive algorithm's ability to extrapolate successfully. It is to be understood that the predictive algorithm could also be tested in other ways. For example, the predictive algorithm may be used on-line on a trial basis to determine whether it gives good results.

Once a predictive algorithm has been validated, it may be implemented in an inferential sensor, as described in more detail below.

4. Exemplary Implementation of a Predictive Algorithm

A predictive algorithm developed using a genetic programming technique, e.g., as described above, may be used in various ways. For example, the predictive algorithm may be implemented in a system that monitors and/or controls the physical, chemical, or biological process for which the predictive algorithm was developed. The physical, chemical, or biological process could be an industrial process in an industrial plant or other facility. For example, the predictive algorithm might be used to help monitor an industrial manufacturing process or to help monitor emissions resulting from an industrial process. Alternatively, the predictive algorithm might be used in a consumer product, e.g., used in an automobile to monitor emissions. Still other implementations of predictive algorithms may be possible.

Figure 3:
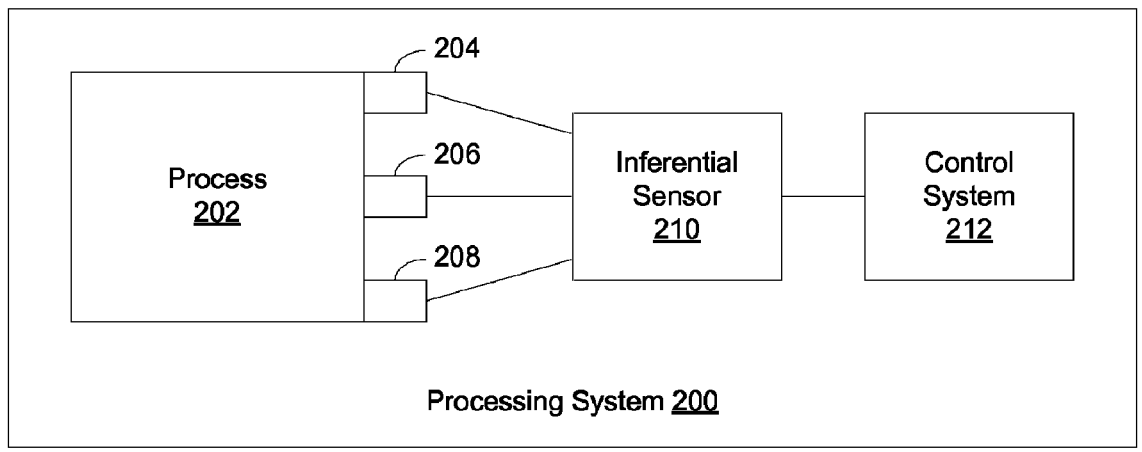
FIG. 3 is a schematic diagram illustrating a processing system in which predictive algorithms may be implemented, in accordance with an exemplary embodiment.

FIG. 3 schematically illustrates an exemplary processing system 200 in which a predictive algorithm may be implemented. Processing system 200 could be an industrial facility, consumer product, or any other system in which a physical, chemical, or biological process occurs. In FIG. 3, the particular physical, chemical, or biological process being monitored is illustrated schematically as process 202. One or more hardware sensors, represented in FIG. 3 as hardware sensors 204-208, may be used to obtain measured values of a plurality of measurable parameters of process 202. The measurable parameters may include, for example, temperature, pressure, flow rate, etc., depending on the nature of process 202. Preferably, the measurable parameters are parameters that hardware sensors 204-208 can measure while process 202 is on-line. Although FIG. 3 shows three hardware sensors monitoring process 202, it is to be understood that a greater or fewer number of hardware sensors may be used.

Hardware sensors 204-208 may be communicatively coupled to an inferential sensor 210. Inferential sensor 210 may be configured to use the measured values of measurable parameters provided by hardware sensors 204-208 to determine an inferred value of an additional, target parameter of process 202. Inferential sensor 210 may make this determination using one or more predictive algorithms. Preferably, at least one of the predictive algorithms was developed using historical data from process 202 by means of the genetic programming technique described above and, thus, optimized with respect to accuracy, complexity, and smoothness. However, inferential sensor 210 might also use other predictive algorithms developed in other ways.

Thus, inferential sensor 210 may use at least one predictive algorithm that predicts the current value of the target parameter based on the measured values provided by hardware sensors 204-208. In some implementations, inferential sensor 210 may simply take the predicted value as the inferred value. Alternatively, inferential sensor 210 might apply an algorithm to determine the inferred value based on the predicted value. In the case that inferential sensor 210 uses more than one predictive algorithm, and thereby obtains more than one predicted value, inferential sensor 210 may determine the inferred value by choosing one of the predicted values, by averaging the predicted values, or in some other manner.

Inferential sensor 210 may provide the inferred value of the target parameter to a control system 212. Control system 212 may then use the inferred value to determine whether to take additional action. For example, control system 212 may compare the inferred value with one or more preset values to determine whether the target parameter is out of range. If the target parameter is out of range, control system 212 might initiate a control of process 202, e.g., to try to bring the target parameter back within range. Alternatively or additionally, control system 212 might log the inferred value or trigger an alarm if the target parameter is found to be out of range.

Inferential sensor 210 and control system 212 could each be implemented as computer systems executing appropriate computer code. Thus, the computer code for inferential sensor 210 may include one or more predictive algorithms developed for process 202 using genetic programming. Inferential sensor 210 and control system 212 could also be integrated together.

Thus, processing system 200 may advantageously monitor a target parameter of process 202, which might be difficult to measure while process 202 is on-line, based on parameters that can be readily measured by hardware sensors while process 202 is on-line. It is to be understood, however, that the use of hardware sensors to obtain current values of input parameters for inferential sensor 210 is exemplary only. Inferential sensor 210 may also obtain current values of one or more parameters in other ways, such as from other inferential sensors.

5. Predictive Algorithm for VOC Emissions

A predictive algorithm for predicting volatile organic compounds (VOC) emissions from a chemical plant was developed using the three-dimensional Pareto-front genetic programming technique described above. A set of historical data was obtained for the plant, which included measurements of VOC emissions and measurements of a number of different process variables that were made at corresponding times. The process variables were density, rate, volatiles, vacuum, temperature, hopper weight, melt index, and pellet water temperature.

Obvious outliers were removed from the historical data. Then the historical was divided into two sets. One set, consisting of 251 data points, was selected for model development (training data). The other set, consisting of 108 data points, was selected for model validation (test data). In order to test the extrapolation capabilities of the predictive algorithm, the test data was selected to be 20% outside of the range of the training data.

Figure 5:
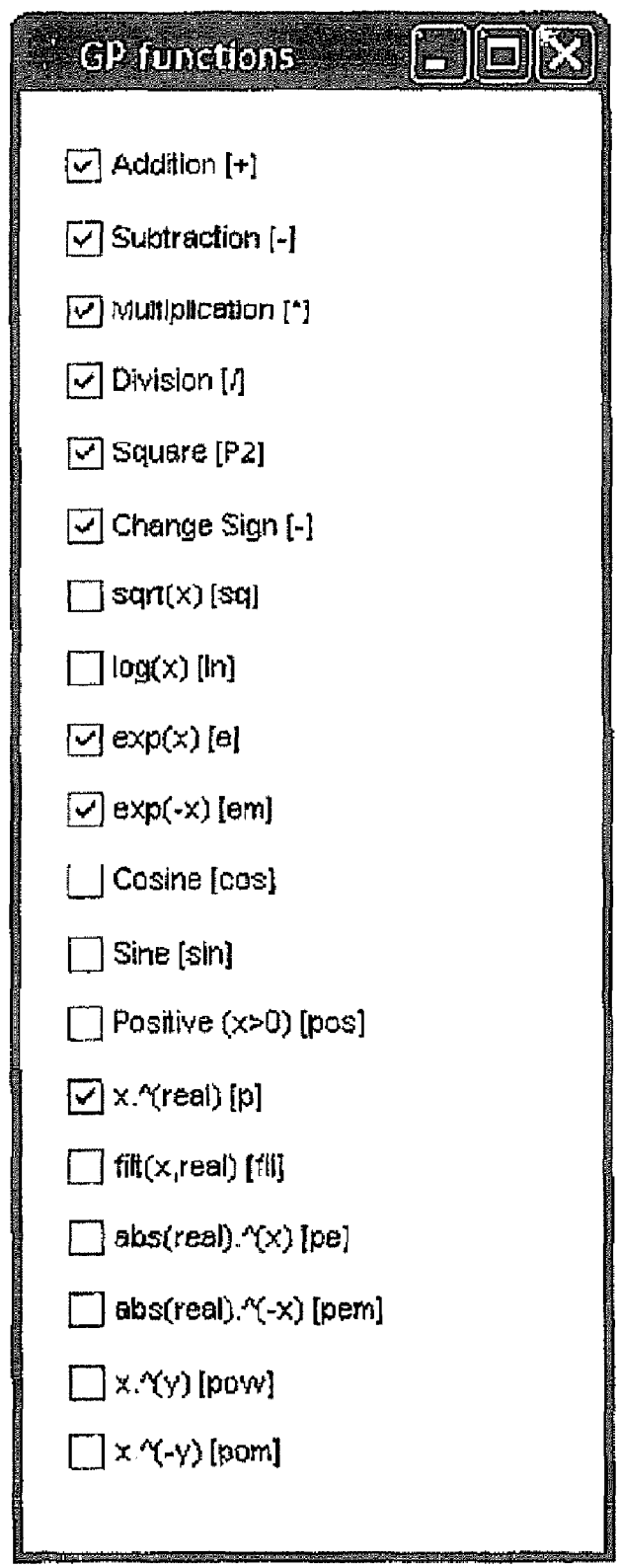
FIG. 5 is a screen shot showing the selection of functions used to develop the predictive algorithm of FIG. 4, in accordance with an exemplary embodiment.

The set-up parameters for the three-dimensional Pareto-front genetic programming are shown in FIG. 4. A set of functions to use for the genetic programming was selected from a menu of available functions, as shown in FIG. 5 (with the selected functions indicated by checkmarks). Complexity was determined by summing the complexity weightings of each of the nodes, with the complexity weighting of a node being the number of nodes in all of the sub-trees depending from the node. Nonlinearity was determined by summing the degrees of the polynomials needed to fit each node function to within a prescribed tolerance, as described above.

At the completion of the genetic programming, only a very few algorithms, out of the population of 100 algorithms, were found to lie on the Pareto-front for optimal accuracy, complexity, and smoothness. The following Pareto-front algorithm was selected for validation:

$$\text{VOC}=8.0746+6.0157e\text{-}14*[\text{Rate}^{1.953}*\text{Hopper Weight}*(\text{Vacuum}+\text{Pellet Water Temperature})] \quad (2)$$

Figure 6:
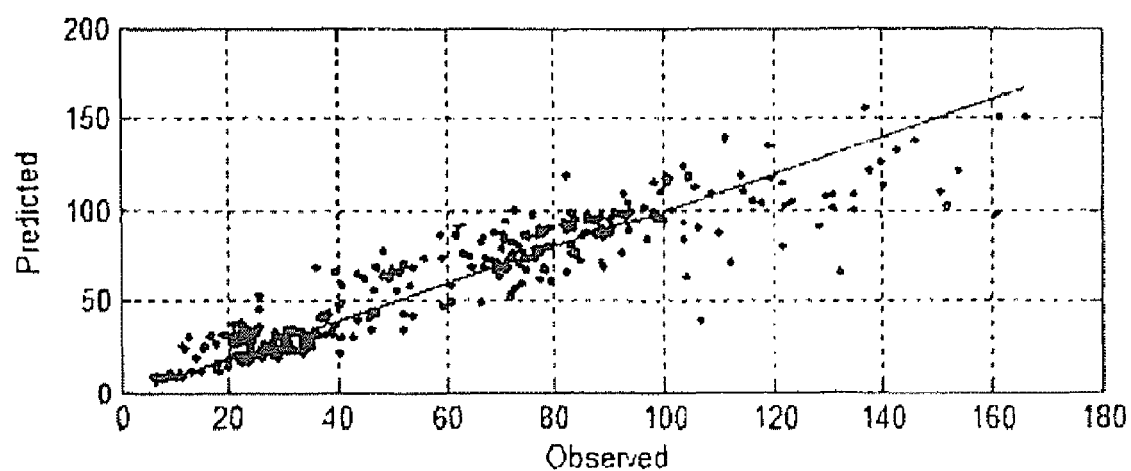
FIG. 6 is a comparison of the VOC emissions predicted by the predicted algorithm of FIG. 4 and the actual VOC emissions in the training data, in accordance with an exemplary embodiment.

The VOC predictions made with this predictive algorithm were in good agreement (correlation coefficient=0.92884) with the training data, as shown in FIG. 6.

Figure 7:
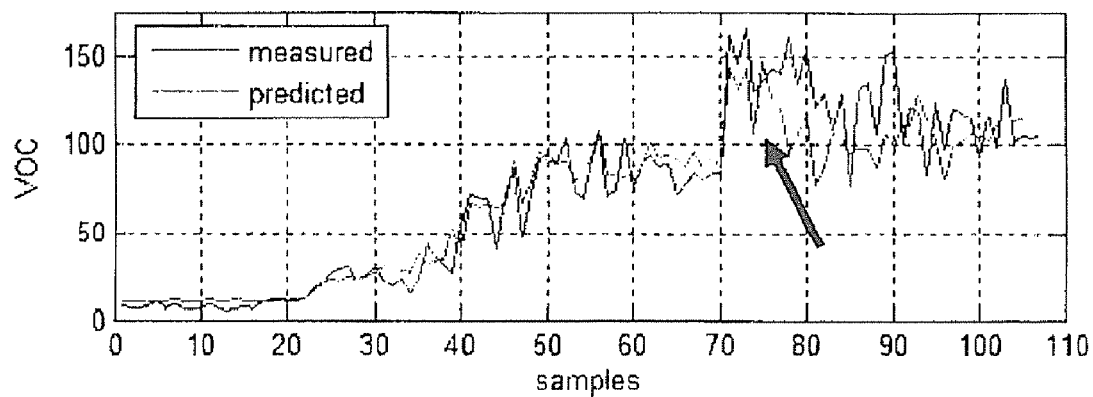
FIG. 7 is a comparison of the VOC emissions predicted by the predicted algorithm of FIG. 4 and the actual VOC emissions in the test data, in accordance with an exemplary embodiment.

Next, the predictive algorithm was validated using the test data. FIG. 7 compares the VOC emissions predicted by algorithm (2) with the VOC emissions that were actually measured. It was found that this predictive algorithm demonstrated good extrapolation performance in the areas that were up to 20% outside of the training range (these were the VOC values between samples 70 and 85 in FIG. 7 as indicated by the arrow).

Figure 8:
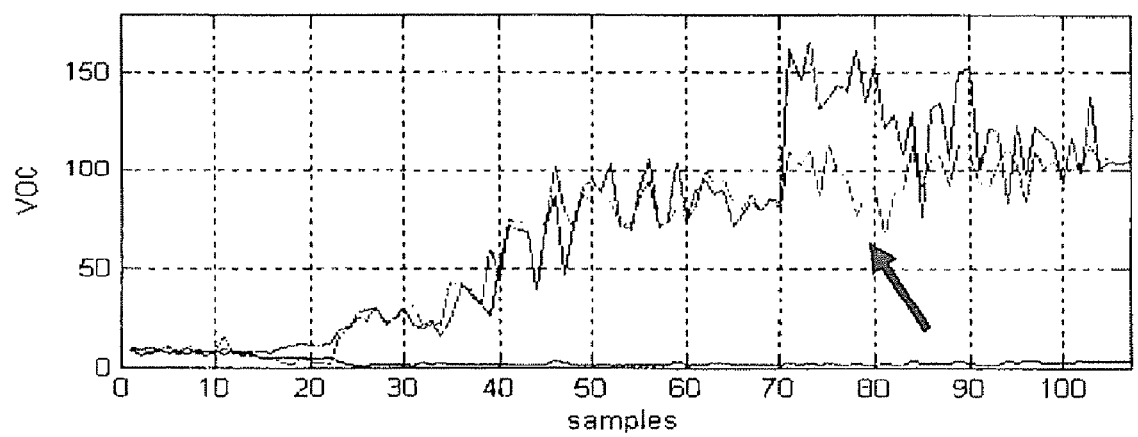
FIG. 8 is a comparison of the VOC emissions predicted by a neural network model and the test data of FIG. 7.

For purposes of comparison, a neural net model was developed using the same training data. The neural net model was then validated using the same test data as the GP-based predictive algorithm. The neural net model, however, was not as good at extrapolating outside of the training range, as indicated by the arrow in FIG. 8.

Thus, this example demonstrates how the genetic programming technique can be used to develop a relatively simple, analytical expression that relates a desired output variable (such as VOC emissions) from a plurality of relevant input variables. In contrast, a neural network model is typically a "black box" model that can be difficult to interpret. In addition, by using a fitness criterion that favors linearity (the smoothness criterion), the genetic programming technique can be used to develop predictive algorithms with good extrapolation capabilities.

6. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of developing a predictive algorithm for predicting at least one output variable based on a plurality of input variables, said method comprising:

obtaining a first set of data representative of a physical, chemical, or biological process, said first set of data including first-set measurements of said at least one output variable and corresponding first-set measurements of said input variables;

evolving a plurality of candidate algorithms using a genetic programming technique that applies at least three fitness criteria, said at least three fitness criteria including an accuracy criterion that evaluates each candidate algorithm's ability to predict said first-set measurements of said at least one output variable based on said corresponding first-set measurements of said input variables, a complexity criterion that evaluates each candidate algorithm's complexity, and a smoothness criterion that evaluates each candidate algorithm's nonlinearity; and selecting one of said candidate algorithms as said predictive algorithm.

2. The method of claim 1, wherein said physical, chemical, or biological process is an industrial process.

3. The method of claim 1, wherein said at least one output variable relates to emissions monitoring.

4. The method of claim 1, wherein said at least one output variable is a physical property, chemical property, mechanical property, material property, or biological property.

5. The method of claim 1, wherein said predictive algorithm is optimal among said candidate algorithms with respect to said three fitness criteria.

6. The method of claim 1, wherein selecting one of said candidate algorithms as said predictive algorithm comprises:
determining which of said candidate algorithms lie on a three-dimensional Pareto-front with respect to said three fitness criteria to obtain a plurality of Pareto-front algorithms.

7. The method of claim 6, wherein selecting one of said candidate algorithms as said predictive algorithm further comprises:
applying at least one additional selection criterion to select said predictive algorithm from among said Pareto-front algorithms.

8. The method of claim 1, further comprising:
obtaining a second set of data representative of said physical, chemical, or biological process, said second set of data including second-set measurements of said at least one output variable and corresponding second-set measurements of said input variables; and
testing said predictive algorithm using said second set of data.

9. The method of claim 8, wherein testing said predictive algorithm using said second set of data comprises:
evaluating said predictive algorithm's ability to predict said second-set measurements of said at least one output variable based on said corresponding second-set measurements of said input variables.

10. A method of monitoring a physical, chemical, or biological process, said method comprising:
determining current values of a plurality of measurable parameters of said physical, chemical, or biological process;
providing said current values to an inferential sensor that is configured to use at least one predictive algorithm that predicts an additional parameter of said physical, chemical, or biological process based on said measurable parameters, said at least one predictive algorithm having been optimized with respect to accuracy, complexity, and smoothness; and
said inferential sensor using said at least one predictive algorithm to determine an inferred value of said additional parameter based on said current values of said measurable parameters.

11. The method of claim 10, wherein determining current values of a plurality of measurable parameters of said physical, chemical, or biological process comprises:
measuring at least one of said available parameters using a hardware sensor.

12. The method of claim 10, wherein said process is an industrial process.

13. The method of claim 12, further comprising:
controlling said industrial process based on said inferred value of said additional parameter.

14. The method of claim 13, wherein controlling said industrial process based on said inferred value of said additional parameter comprises:
comparing said inferred value with a preset value.

15. The method of claim 10, wherein said additional parameter is a physical property, chemical property, mechanical property, material property, or biological property.

16. The method of claim 10, further comprising:
developing said at least one predictive algorithm using a genetic programming technique applied to historical values of said measurable parameters and historical values of said additional parameter, said historical values having been previously obtained for said physical, chemical, or biological process.

17. The method of claim 16, wherein said historical values of said measurable parameters define a first range, and wherein at least a subset of said current values of said measurable parameters are outside of said first range.

18. The method of claim 16, wherein said historical values of said additional parameter define a second range, and wherein said inferred value of said additional parameter is outside of said second range.

19. A system for monitoring a physical, chemical, or biological process, said system comprising:
at least one hardware sensor for obtaining measured values of a plurality of parameters of said physical, chemical, or biological process; and
an inferential sensor for determining an inferred value of an additional parameter of said physical, chemical, or biological process based on said measured values, said inferential sensor being configured to determine said inferred value using at least one predictive algorithm that has been optimized with respect to accuracy, complexity, and smoothness using a genetic programming technique.

20. The system of claim 19, further comprising:
a control system for controlling said physical, chemical, or biological process based on said inferred value.

* * * * *